US007420983B2

United States Patent
Donovan

(10) Patent No.: US 7,420,983 B2
(45) Date of Patent: Sep. 2, 2008

(54) DYNAMIC ASSIGNMENT OF RE-ASSEMBLY QUEUES

(75) Inventor: Peter Donovan, Orleans (CA)

(73) Assignee: Alcatel Lucent, Paris (FR)

( * ) Notice: Subject to any disclaimer, the term of this patent is extended or adjusted under 35 U.S.C. 154(b) by 1194 days.

(21) Appl. No.: 10/386,702

(22) Filed: Mar. 13, 2003

(65) Prior Publication Data

US 2004/0179533 A1    Sep. 16, 2004

(51) Int. Cl.
*H04L 12/54*    (2006.01)
*H04L 12/56*    (2006.01)

(52) U.S. Cl. ........................... 370/429; 370/412
(58) Field of Classification Search ............... None
See application file for complete search history.

(56) References Cited

U.S. PATENT DOCUMENTS

| | | | |
|---|---|---|---|
| 6,240,066 B1 * | 5/2001 | Nagarajan et al. | 370/230 |
| 6,678,813 B1 * | 1/2004 | Le | 711/172 |
| 6,717,912 B1 * | 4/2004 | Lemyre et al. | 370/230 |
| 6,721,796 B1 * | 4/2004 | Wong | 709/232 |
| 6,961,835 B2 * | 11/2005 | Lightstone et al. | 711/171 |
| 7,003,597 B2 * | 2/2006 | Georgiou et al. | 710/56 |
| 7,307,998 B1 * | 12/2007 | Wang et al. | 370/412 |
| 7,346,063 B1 * | 3/2008 | Herbst | 370/395.7 |
| 2002/0136228 A1 * | 9/2002 | Miyamoto | 370/411 |
| 2003/0223416 A1 * | 12/2003 | Rojas et al. | 370/389 |
| 2004/0078532 A1 * | 4/2004 | Tremaine | 711/160 |
| 2005/0008020 A1 * | 1/2005 | Ashwood-Smith et al. | 370/395.1 |
| 2005/0235129 A1 * | 10/2005 | Sokol | 711/170 |

* cited by examiner

Primary Examiner—Kwang B. Yao
Assistant Examiner—Warner Wong

(57) ABSTRACT

Methods and apparatus for the dynamic assignment of re-assembly queues to multiple connections in a communications system are described. In a preferred embodiment of the invention an ATM to MPLS mediation application is implemented. In the mediation process ATM cells are assigned to re-assembly queues where they are converted to MPLS packets for transmission over a MPLS tunnel. Typically there are many more connections than re-assembly queues which necessitates a dynamic assignment of the re-assembly queues to ensure efficient operation of the system. Re-assembly queues are serviced based on either a cell count or a timing factor.

10 Claims, 5 Drawing Sheets

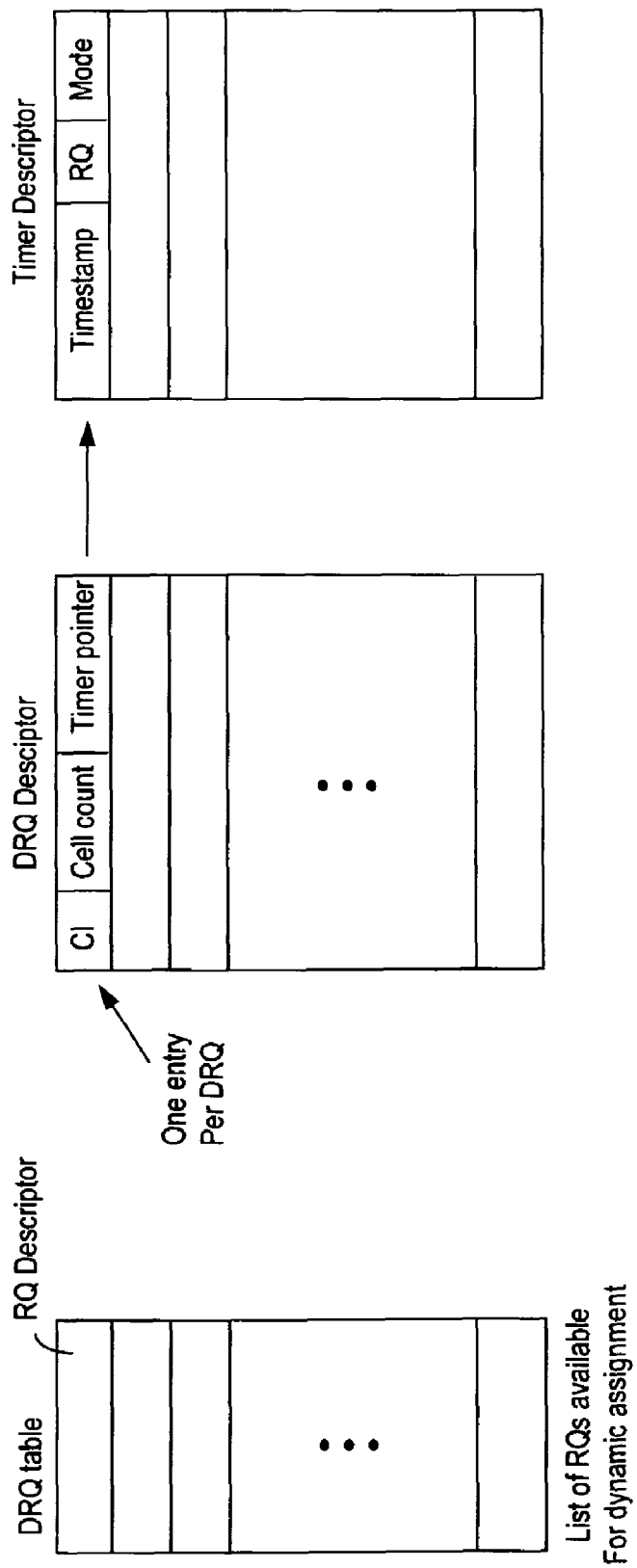

DYNAMIC ASSIGNMENT OF RE-ASSEMBLY QUEUES

FIELD OF THE INVENTION

This invention relates to communications systems and more particularly to methods and apparatus for the dynamic assignment of re-assembly queues in such systems.

BACKGROUND

Communications networks typically incorporate multiple system architectures implementing multiple protocols for the delivery of services such as voice, video and data. For example, the delivery of voice messaging over the Internet using a connectionless format can be more economical than the connection oriented conventional PSTN. To meet user expectations, however, the quality of service provided by an Internet service provider needs to be at least as good as that provided by the PSTN. This can pose a problem for a "best effort" service as typically provided by the Internet.

Accordingly, considerable effort has been, and continues to be, devoted to the development of systems that enable the transport of real time services over connectionless architectures. Asynchronous Transfer Mode (ATM), based on a fixed size cell, is frequently used to provide services where various categories of service can be accommodated. These include real time transmission of voice and video as well as non-real time for services such as data.

MPLS (multi protocol label switching) is a relatively new technology that allocates tags or labels to traffic packets and provides the ability to differentiate classes for individual data flows. The labels are in effect like an address label in a conventional package delivery system. MPLS includes the ability to tunnel through many routing stages and to do so using explicit routing rather than hop by hop routing. When packets enter a MPLS-based network they are given a label or identifier. These identifiers contain routing information such as source, destination, bandwidth and delay criteria.

The mediation of ATM to MPLS requires that cells at the ingress side of the MPLS network be converted to MPLS packets for transport through the MPLS tunnel. At the downstream end of the MPLS tunnel, MPLS packets are converted back to ATM cells for further processing by the downstream ATM network.

A routing switch platform (RSP) such as an Alcatel 7670 RSP includes hardware and software which can provide the mediation function at each end of the MPLS tunnel. The ATM cell to MPLS packet assembly facilitated by the mediation function typically requires that multiple queues be provided for storing connections during the packet assembly or re-assembly process. These queues known, as re-assembly queues, are assigned to connections and in a typical implementation the ratio of queues to connections is low in order to preserve system resources. For effective use of storage resources allocated to the re-assembly queues, a dynamic assignment of the re-assembly queues, is presented in the present invention.

Since ATM to MPLS mediation is a relatively new technology the problem of dynamically assigning re-assembly queues has not been solved in the prior art in as much as the problem has not heretofore arisen. Typically, in connection-less, packet oriented systems such as IP routers, there is a queue per quality of service (QLS) level, per class of service (COS) level or per flow.

In connection-oriented systems such as an ATM switch, there is typically a queue per connection. Mediation applications like the present ATM to MPLS implementation require inter workings of connectionless and connection oriented systems hence queue management problems arise since the queues are assigned differently in the different types of system.

The present invention addresses the aforementioned requirement of providing ATM over an MPLS network and in particular the assembly of ATM cells into MPLS packets for transmission through the MPLS network in an MPLS tunnel in, for example, a packet over sonnet (POS) application. More particularly, the invention is directed to the problem of efficiently using re-assembly queues that perform the cell to packet assembly operation in a communications system. Efficient use of these queues is especially important in cases where the ratio of queues to ATM connections supported by the queues is very low, for example 1:100 as is the case for an OC 48 to POS card on a routing switch platform such as the Alcatel 7670. In a typical application an OC 48 POS card may support up to or more than 100 k ATM connections with only a limited number of re-assembly queues (for example 1024) hence the need to dynamically assign these queues to the ATM connections is apparent.

As indicated previously the prior art does not address the problem since ATM to MPLS mediation is a relative new application.

SUMMARY OF THE INVENTION

The present invention provides systems and apparatus for the dynamic re-assignment of re-assembly queues in a communication system having a plurality of re-assembly queues and a plurality of connections. In a preferred embodiment ATM cells are transported over a MPLS network.

Therefore in accordance with a first aspect of the present invention there is provided an apparatus for dynamically assigning a re-assembly queue to a connection in a communications system having a plurality of re-assembly queues and a plurality of connections, comprising: means for assigning an available re-assembly queue to the connection; means for counting a number of cells received from the connection and forwarded to the assigned re-assembly queue; means for timing a duration during which the assigned re-assembly queue is assigned to the connection; and means for making the assigned re-assembly queue available for another connection and for initiating transmission of a packet comprising the received cells in the re-assembly queue responsive to either the number of received cells exceeding a predetermined cell count parameter, or the duration exceeding a predetermined time parameter.

In accordance with a second aspect of the present invention there is provided a method of dynamically assigning a re-assembly queue to a connection in a communications system having a plurality of re-assembly queues and a plurality of connections, the method comprising the steps of: a) assigning an available re-assembly queue to the connection; b) counting a number of cells received from the connection and forwarded to the assigned re-assembly queue; c) timing a duration during which the assigned re-assembly queue is assigned to the connection; and d) making the assigned re-assembly queue available for another connection and for initiating transmission of a packet comprising the received cells in the re-assembly queue responsive to either the number of received cells exceeding a predetermined cell count parameter, or the duration exceeding a predetermined time parameter.

BRIEF DESCRIPTION OF THE DRAWINGS

The invention will now be described in greater detail having reference to the attached drawings wherein;

FIGS. 2A to 2E show tables used to implement the invention;

DETAILED DESCRIPTION OF THE INVENTION

Figure 1:
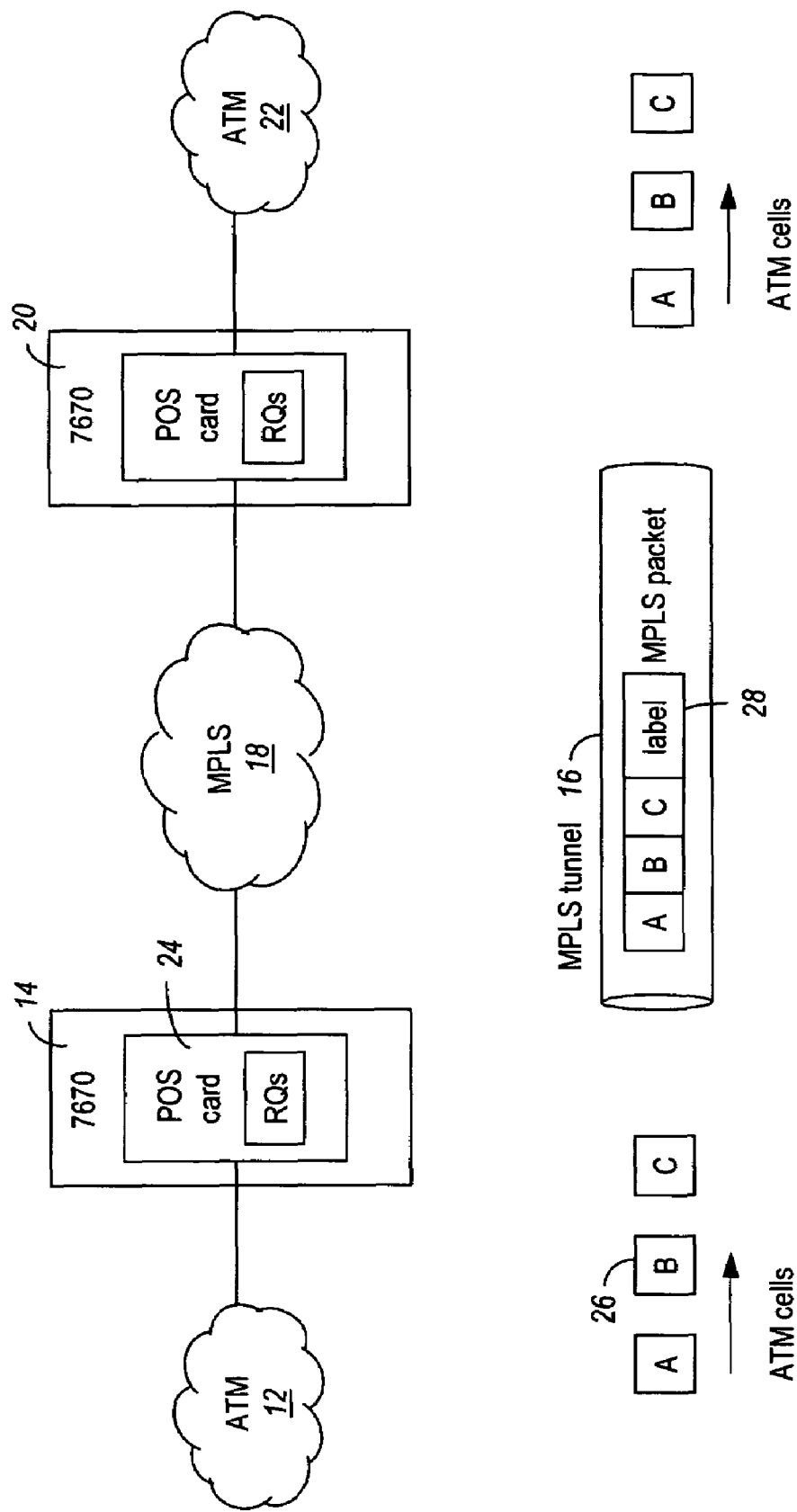
FIG. 1 is an illustration of an ATM to MPLS mediation application.

FIG. 1 shows an exemplary implementation of ATM over an MPLS network. ATM cells from the first ATM network 12 are processed by the first RSP 14 at the egress side of the ATM network where they are mediated to MPLS packets for transport through a MPLS tunnel 16 in the MPLS network 18. The MPLS packets are then reconverted by the second RSP 20 and forwarded to the second ATM network 22 as ATM cells. The POS card 24 in the first RSP 14 performs the mediation function by re-assembling ATM cells 26 into MPLS packets 28 for transmission in the tunnel 16. In the exemplary implementation a network processor such as an IBM Rainier performs the re-assembly function. The MPLS network 18 will typically carry connections other than ATM and it is, therefore necessary to ensure that all connections are treated fairly. In the present implementation, for example, the Rainier network processor can simultaneously re-assemble up to 3072 packets although typically only 1024 involve ATM cells. The aforementioned 3072 RCBs is a hardware limitation attributable to the IBM Rainier. The 1024 RCBs assigned to ATM is a software implementation decision. Neither of these values are to be interpreted as limitations of the invention. A free list, which is initiated and maintained by control software lists up to 3072 entries in this implementation. A re-assembly queue identifier which is available for DRQ service is placed on the free list. The free list may be modified dynamically allowing online reconfiguration. The 1024 re-assembly queues are used to perform the re-assembly function for up to 100K ATM connections. Sharing the re-assembly queues (RQs) between the ATM connections require dynamic assignment of the RQs and this dynamic assignment is provided by the present invention.

According to the invention, an RQ is assigned to only one ATM connection at any one time. During that time, ATM cells received from a connection are stored in the corresponding RQ, from which the cells are reassembled into an MPLS packet. When re-assembly of an MPLS packet is complete, the packet is forwarded to an I/O port for transmission over the MPLS network. Assignment of RQs to ATM connections is controlled, with an exception that will be explained later, by two parameters: reassembly time and packet size. The timer parameter specifies a maximum amount of time that an RQ can be assigned to an ATM connection. This is the amount of time from when an MPLS packet is opened until it is closed. When a packet is closed its associated RQ can then be made available for another connection. A cell count parameter specifies a maximum size of an MPLS packet. Like the time parameter, when the cell count parameter is reached the MPLS packet is closed and its associated RQ is then made available for another connection. Both parameters are programmable and whichever one is reached first will cause the packet to be closed and its associated RQ to be subsequently re-assigned to another connection. In fact, it is possible for an RQ to be re-assigned to the same ATM connection, however this is unlikely when the queue to connection ratio is low (e.g. 1:100).

In a preferred embodiment, the cell count parameter is 10 and the time parameter is 1 millisecond. However, these values are programmable and their optimum values depend on the type of ATM traffic being carried between the first and second ATM networks. As mentioned earlier, whichever parameter is reached first will cause the associated MPLS packet to be closed and transmitted. For example, if only 7 cells are re-assembled into an MPLS packet after 1 millisecond has elapsed, from when the RQ was assigned to the connection, then this will be the size of the MPLS packet when it is transmitted.

The exception mentioned earlier is a "safety net". The safety net provides that should the number of available RQs drop below a minimum number then the oldest open-packet connection is automatically closed and its RQ returned to the list of available RQs. In reality, of the total number of DRQs made available by software a small number of these DRQs are reserved as a safety net. Typically all of the 1024 available queues will not be assigned simultaneously. Once the list of available DRQs also known as the free list, drops below a safe level the oldest open packet in an RQ is released or closed. This causes the packet to be forwarded with its current cell count and returns its assigned DRQ to the free list. The newly released DRQ is now available for a next connection. DRQs are added to the bottom of the free list and removed from the top to avoid assigning the newly released DRQ to the same connection that just released it.

Figure 2B:
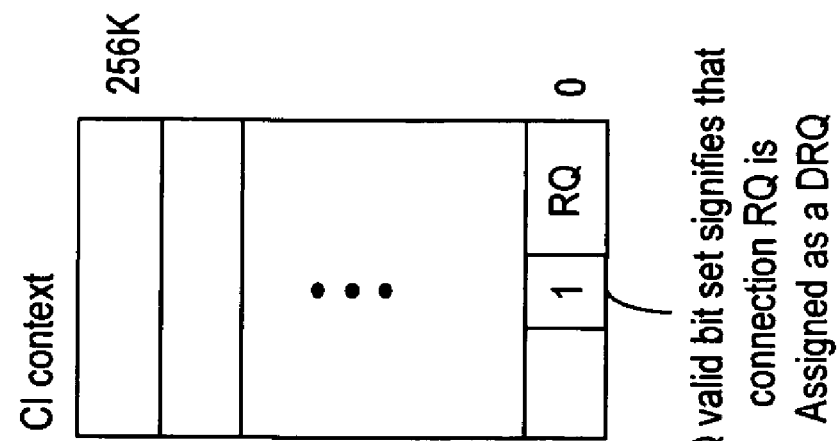
Figure 2A:
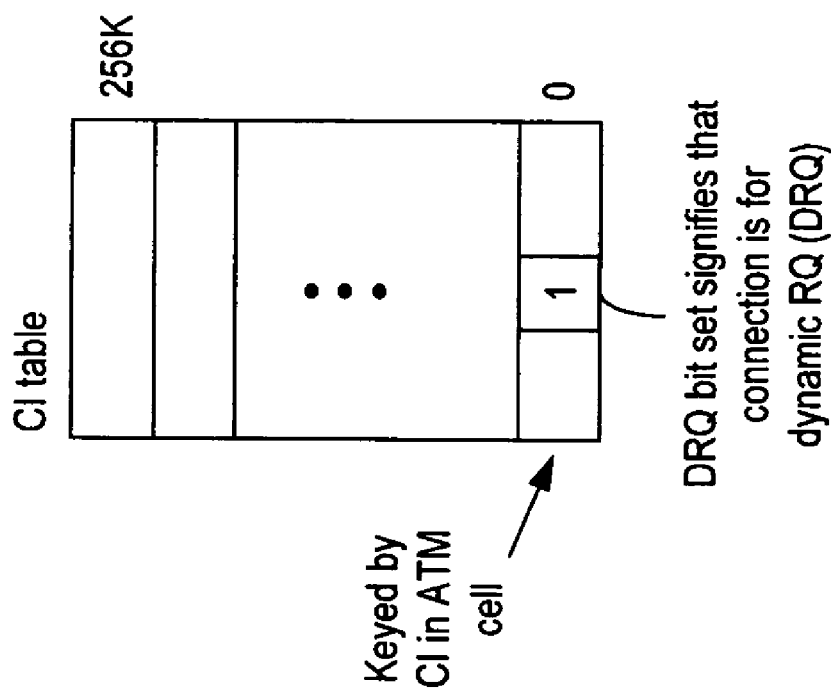

FIGS. 2A to 2E are illustrations of tables used to implement the invention. The tables themselves may be implemented as linked lists. The table of FIG. 2A is a CI (connection identifier) table for identifying ATM connections that are to have their RQs assigned dynamically. This identification is made by setting a DRQ bit in an entry for a CI. There is a unique entry for each CI in the table. ATM cells have a field for identifying their CI, which is used as an index to its corresponding entry in the table. The table of FIG. 2B is a CI context table for identifying an RQ assigned to a CI. There is a unique entry for each CI in this table as well. An RQ valid bit set in an entry signifies that the RQ named in the entry has been dynamically assigned. The table of FIG. 2C, the DRQ table, lists the RQs that are available for dynamic assignment. The table of FIG. 2D, the DRQ descriptor table, having one entry per dynamically assigned RQ (DRQ) is indexed by the associated RQ. Each entry in the DRQ table contains the cell count parameter for the DRQ and a pointer to a timer for the DRQ. The final table of FIG. 2E, the Timer descriptor table, has an entry for each timer, which is merely a timestamp of when the DRQ was assigned to the connection (CI) and an identification of the RQ that is the DRQ. Note: in the present implementation there are 3072 RQs, all of which can be assigned to the DRQ free list. In the present implementation 1024 of the RQs are assigned to the DRQ free list but this is, as indicated previously a software choice.

Figure 3:
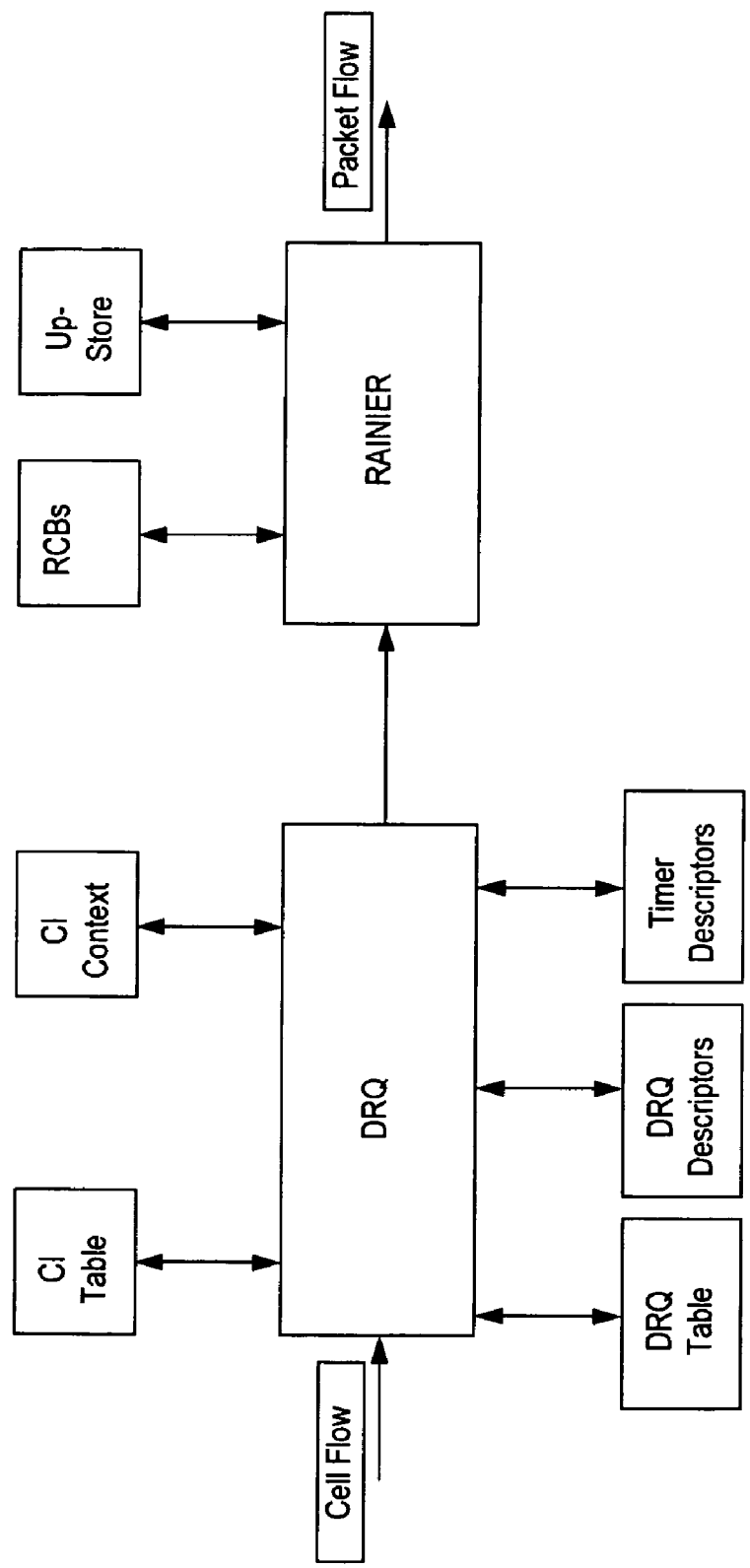
FIG. 3 is a simple block diagram of the network processor.

FIG. 3 is a simple block diagram showing the relationship between the DRQ and the Rainier according to an implementation of the present invention. Referring to FIG. 3, the flow between the DRQ block and the Rainier is segmented into fixed length cells. These cells are Rainier specific and are targeted to RCBs for re-assembly into packets into the up store. After an RQ is assigned as a DRQ, it can then be dynamically assigned to connections as required and according to the limits set by the parameters. The timer pointer in the DRQ descriptor table points to the entry in the Timer Descriptor table that is the timer for the corresponding DRQ. The timer function is implemented by comparing a timestamp to the present time to determine if the time elapsed from when the DRQ was assigned exceeds the time parameter.

Figure 4:
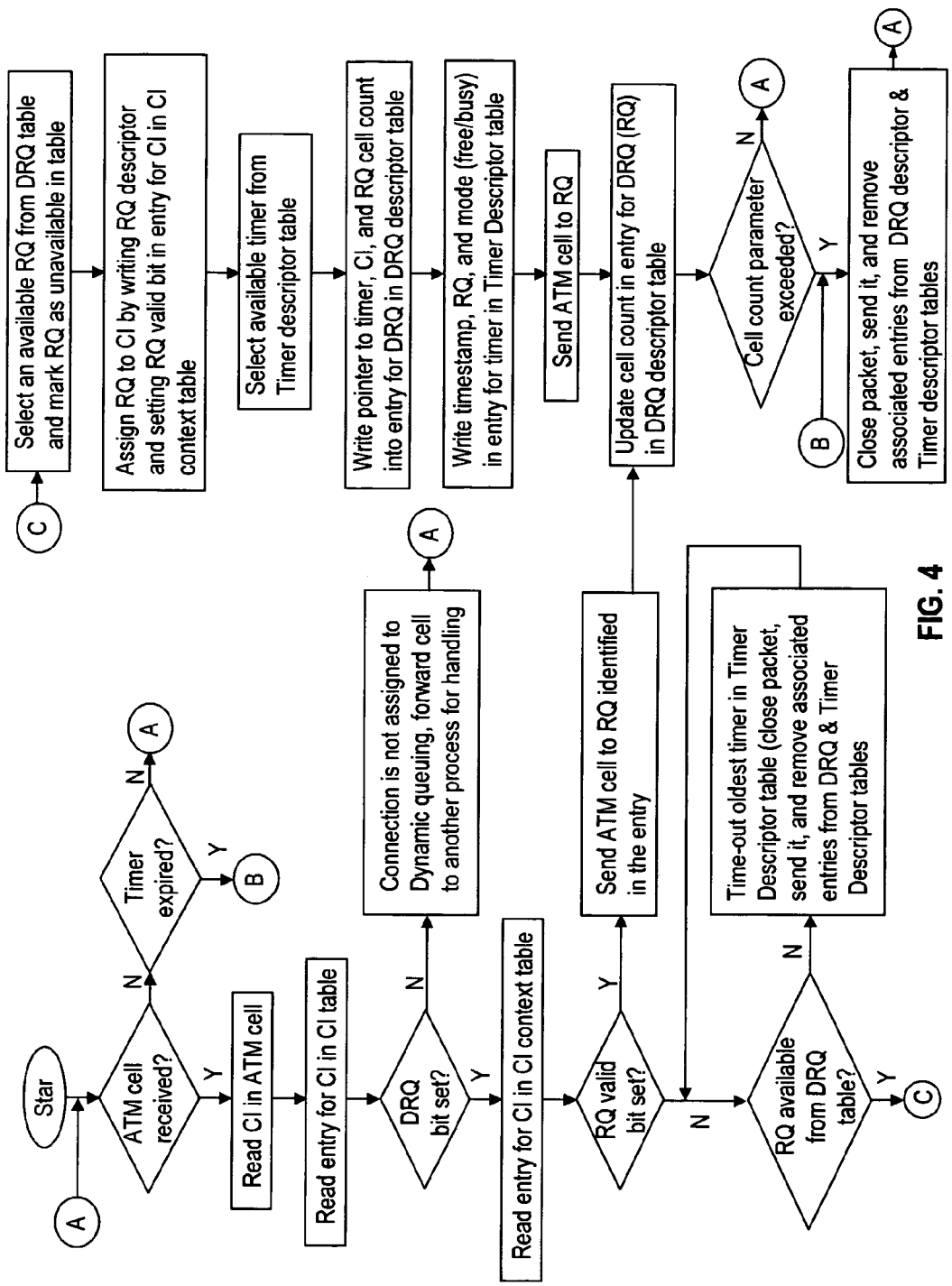
FIG. 4 is a flow chart showing the steps in the method of dynamically assigning re-assembly queues.

FIG. 4 is a flowchart showing the steps in the method of dynamically assigning re-assembly queues. The flowchart should be self-explanatory when read with reference to the tables shown in FIGS. 2A to 2E. A key point of the method is that an MPLS packet will be closed and transmitted when either: the cell count limit (cell count parameter) for the packet is reached, or the re-assembly time for the packet is reached (time parameter), or there are no more DRQs available and the packet has the oldest timestamp.

An additional feature of the invention is to add hysteresis to the required number of available DRQs. In this case, high and low limits to the number of available DRQs are applied to determine when timers need to be timed out to free-up DRQs. That is, several timers would be timed-out at the same time for greater efficiency in freeing up DRQs.

Although specific embodiments of the invention have been described and illustrated it will be apparent to one skilled in the art that numerous variations and alterations can be implemented without departing from the basic concept. It is to be understood, however, that such variations and alterations will fall within the full scope of the invention as defined by the appended claims.

I claim:

1. An apparatus for dynamically assigning a re-assembly queue to a connection in a communications system having a plurality of re-assembly queues and a plurality of connections, comprising:
   means for determining whether the connection is to have a re-assembly queue assigned dynamically thereto;
   means for assigning an available re-assembly queue to the connection, and wherein the means for assigning comprises means for determining a re-assembly queue with the Maximum amount of time duration and making that re assembly queue available responsive to there not being any available re-assembly queues, and wherein the means for assigning is further responsive to there being fewer available re-assembly queues than a predetermined lower limit, and the means for determining operates to determine a predetermined number of re-assembly queues having the maximum amount of time and making those reassembly queues available, and wherein the means for assigning is operable to select an available re-assembly queue from the plurality of re-assembly queues;
   means for counting a number of cells received from the connection and forwarded to the assigned re-assembly queue;
   means for timing a duration during which the assigned re-assembly queue is assigned to the connection; and
   means for making the assigned re-assembly queue available for another connection and for initiating transmission of a packet comprising the received cells in the reassembly queue responsive to either the number of received cells exceeding a predetermined cell count parameter, or the duration exceeding a predetermined time parameter.

2. The apparatus of claim 1 wherein the respective means are linked lists.

3. The apparatus of claim 1 wherein the means for counting and means for timing are implemented in hardware.

4. The apparatus of claim 1 wherein a preferred value of cell count is 10 and a preferred timer parameter is 1 msec.

5. The apparatus of claim 1 wherein the cells are ATM cells and the packets are MPLS packets.

6. A method of dynamically assigning a re-assembly queue to a connection in a communications system having a plurality of re-assembly queues and a plurality of connections, the method comprising the steps of:
   a) assigning an available re-assembly queue to the connection wherein said step of assigning selects an available re-assembly queue from the plurality of re-assembly queues;
   b) counting a number of cells received from the connection and forwarded to the assigned re-assembly queue;
   c) timing a duration during which the assigned re-assembly queue is assigned to the connection; and
   d) making the assigned re-assembly queue available for another connection and for initiating transmission of a packet comprising the received cells in the re-assembly queue responsive to either the number of received cells exceeding a predetermined cell count parameter, or the duration exceeding a predetermined time parameter; and wherein a packet will be closed and transmitted when either: the cell count limit for the packet is reached, or the re-assembly time for the packet is reached and the packet has the oldest timestamp.

7. The method of claim 6, wherein the step of assigning includes the step of determining a re-assembly queue with the longest duration and making that re-assembly queue available responsive to there not being any available re-assembly queues.

8. The method of claim 7, wherein the step of assigning is further responsive to there being fewer available re-assembly queues than a predetermined lower limit, and the step of determining is operable to determine a predetermined number of re-assembly queues having the longest durations and making those re-assembly queues available.

9. The method of claim 8, further comprising the step of determining whether the connection is to have a re-assembly queue assigned dynamically thereto.

10. The method of claim 7 wherein the cells are ATM cells and the packets are MPLS packets.

* * * * *